United States Patent
Barlag

(10) Patent No.: US 9,108,365 B2
(45) Date of Patent: Aug. 18, 2015

(54) METHOD FOR MANUFACTURING A FRC/FRP-COMPONENT FROM ROVINGS WITH A MOULDING TOOL

(75) Inventor: Carsten Barlag, Jever (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 503 days.

(21) Appl. No.: 12/936,422

(22) PCT Filed: Apr. 7, 2009

(86) PCT No.: PCT/EP2009/002568
§ 371 (c)(1),
(2), (4) Date: Nov. 16, 2010

(87) PCT Pub. No.: WO2009/124724
PCT Pub. Date: Oct. 15, 2009

(65) Prior Publication Data
US 2011/0115124 A1    May 19, 2011

Related U.S. Application Data

(60) Provisional application No. 61/042,831, filed on Apr. 7, 2008.

(30) Foreign Application Priority Data

Apr. 7, 2008   (DE) .......................... 10 2008 017 573

(51) Int. Cl.
| | |
|---|---|
| *B29C 70/38* | (2006.01) |
| *B29C 53/56* | (2006.01) |
| *B29C 70/54* | (2006.01) |
| *B29C 70/56* | (2006.01) |
| *B29B 11/16* | (2006.01) |
| *B29C 70/20* | (2006.01) |

(52) U.S. Cl.
CPC ............ *B29C 70/382* (2013.01); *B29C 53/564* (2013.01); *B29C 70/543* (2013.01); *B29C 70/56* (2013.01); *B29B 11/16* (2013.01); *B29C 70/20* (2013.01)

(58) Field of Classification Search
CPC .... B29C 70/382; B29C 70/20; B29C 70/543; B29C 70/56; B29C 53/564
USPC ......................................... 264/248, 257, 275
See application file for complete search history.

(56) References Cited

U.S. PATENT DOCUMENTS

| 4,594,122 A | 6/1986 | McConnell et al. |
| 5,558,738 A | 9/1996 | Rector |

(Continued)

FOREIGN PATENT DOCUMENTS

| CN | 1346737 A | 5/2002 |
| CN | 201026668 Y | 2/2008 |

(Continued)

OTHER PUBLICATIONS

International Search Report for corresponding application PCT/EP2009/002568, Aug. 6, 2009.

(Continued)

*Primary Examiner* — Edmund Lee
(74) *Attorney, Agent, or Firm* — Ingrassia Fisher & Lorenz, P.C.

(57) ABSTRACT

The invention pertains to a method for manufacturing a FRC/FRP-component component from rovings by means of a molding tool with a mold surface, featuring the steps of: applying rovings formed of dry fibers onto the mold surface by depositing the rovings under tension with predetermined orientations between deflection devices by means of an application device, applying binder material onto the tensioned rovings; consolidating the arrangement of fiber strands and binder material by applying heat and pressure in order to produce a preform for the component to be manufactured; separating the preform from the deflection devices and removing the preform from the molding tool; and carrying out an injection process or infusion process in order to manufacture the component after separating the preform from the deflection devices; as well as to a molding tool and a device for implementing the method.

19 Claims, 3 Drawing Sheets

(56) References Cited

U.S. PATENT DOCUMENTS

| | | |
|---|---|---|
| 6,808,378 B2 | 10/2004 | Wirth |
| 7,758,946 B2 | 7/2010 | Maki |
| 2002/0014715 A1 | 2/2002 | Wirth |
| 2006/0169396 A1 | 8/2006 | Joern |
| 2007/0232171 A1 | 10/2007 | Maki |
| 2010/0126652 A1 | 5/2010 | Joern et al. |

FOREIGN PATENT DOCUMENTS

| | | |
|---|---|---|
| DE | 4234083 A1 | 4/1994 |
| DE | 10250826 A1 | 5/2004 |
| DE | 10320791 A1 | 11/2004 |
| DE | 102004007313 A1 | 9/2005 |
| DE | 102005034393 A1 | 2/2007 |
| EP | 0193380 A2 | 9/1986 |
| EP | 0591822 A1 | 4/1994 |
| EP | 1842656 A1 | 10/2007 |
| JP | 09176933 A | 7/1997 |
| JP | 11001844 A | 1/1999 |
| JP | 2005097759 A | 4/2005 |

OTHER PUBLICATIONS

International Preliminary Report for Patentability and Written Opinion for corresponding application PCT/EP2009/002568, Nov. 30, 2010.

METHOD FOR MANUFACTURING A FRC/FRP-COMPONENT FROM ROVINGS WITH A MOULDING TOOL

CROSS REFERENCE TO RELATED APPLICATIONS

This application claims priority to PCT Application No. PCT/EP2009/002568, filed Apr. 7, 2009; which claims priority to German Patent Application No. DE 10 2008 017 573.0, filed Apr. 7, 2008, and claims the benefit to U.S. Provisional Patent Application No. 61/042,831, filed Apr. 7, 2008, the entire disclosures of which applications are hereby incorporated by reference.

BACKGROUND

The invention pertains to a method for manufacturing a FRC/FRP-component from rovings with a moulding tool and to a moulding tool for implementing the method.

JP 09-176933 discloses a three dimensional fiber structure, which substantially comprises two plate-like portions, which are mutually jointed at a corner portion in a flexed way. The plate-like portions comprise each a inner and a outer layer, each of which consist of a group of laminated yarns, which respectively are arranged in a plane and are mutually sewed in the thickness direction, wherein in the corner portion filler fibers are inserted between the inner and outer layer in order to improve stability. JP 11-001844 discloses a three dimensional fiber structure having an un-developable structured surface. The fiber structure consists of several laminated fiber layers arranged in the fiber structure and being sewed in the thickness direction.

DE 10 2004 0077 313 A1 discloses a method for manufacturing a moulded polymer component that is reinforced with endless fibers. In this method, endless fibers impregnated with a plasticized polymer are arranged on an auxiliary mould by means of a handling device. In order to accommodate the endless fibers, the auxiliary mould is equipped with winding spindles for accommodating the endless fibers in the respectively desired orientation. A stripping device is assigned to the winding spindles and designed for stripping off the endless fibers wound up on the winding spindles. The oriented endless fibers are transferred into an open moulding tool that consists of at least two parts with the aid of the auxiliary mould and deposited therein, wherein the moulding tool is subsequently closed and the impregnated, oriented endless fibers are compression-moulded by themselves or together with another added polymer such that a moulded polymer component reinforced with endless fibers is produced. The moulded polymer component is subsequently cooled and removed from the moulding tool.

EP 0 193 380 A2 discloses a method for manufacturing a helmet from filament yarns, in which the filament yarns are deposited on a part of a mould in random curved paths in order to form the component surface, wherein the filament yarns are distributed over the surface of the part of the mould and deflected on pins that are arranged on the surface of the part of the mould such that they can be retracted and extended.

DE 42 34 083 A1 discloses a method for the placement of textile threads, in which each thread is continuously supplied on a curve-shaped path and placed around variable fixed points arranged within the curve-shaped path.

DE 10 2005 034 393 A1 discloses a method for the friction-oriented placement of textile fibers.

SUMMARY OF THE INVENTION

It is the objective of the invention to make available a method for manufacturing a FRC- or FRP-component, as well as a device for implementing the method, that respectively is suitable for the manufacture of complex FRC- or FRP-components.

This object is attained with the characteristics of the independent claims one or more embodiments disclosed and described herein. Other embodiments are also disclosed and described herein.

The inventive method and the inventive device respectively make it possible to manufacture preforms and therefore components that have an at least partially undevelopable shape with relatively high accuracy.

The invention proposes a method for manufacturing a FRC/FRP-component component from at least one roving with a moulding tool, wherein said method features, in particular, the following steps:

applying at least one roving formed of dry fibers onto the mould surface by depositing the roving under tension by means of an application device, namely with predetermined orientation between deflection devices that are arranged laterally of an application surface that has a convex shape at least in certain areas and in the longitudinal direction thereof, wherein the at least one roving is tensioned between the deflection devices along the mould surface in such a way that the rovings cover the mould surface at least in certain areas in order to produce the preform, applying binder material onto the tensioned rovings;

consolidating the arrangement of fiber strands and binder material by applying heat and optionally pressure in order to produce a preform for the component to be manufactured;

separating the preform from the deflection devices and removing the preform from the moulding tool; and carrying out an injection process or infusion process in order to manufacture the component after separating the preform from the deflection devices.

According to the invention, the at least one roving may be tensioned between the deflection devices, in particular, such that the at least one roving covers the mould surface at least in certain areas in order to produce the preform, and the roving is held by the deflection devices such that a tensile stress of at least 30 N is maintained.

Since the at least one roving is tensioned over the mould surface with a predetermined tensile stress or a predetermined minimum tensile stress, the roving sections that traverse the mould surface extend thereon linearly. This means that the consolidated preform is formed of roving sections that very accurately extend linearly. Consequently, the respective component manufactured from the preform is also formed of rovings or fibers that extend linearly such that an optimal component quality can be ensured.

The tensioning of the at least one roving over the mould surface with a predetermined tensile stress or a predetermined minimum tensile stress also causes the deposited arrangement of rovings to be pre-compacted together with the binder material. Consequently, it is not necessary to carry out a compression process or generally to exert pressure upon the arrangement of fiber strands and binder material during the consolidation thereof such that the course of the fibers or rovings, particularly the linearity of the course of the fibers or rovings, is not altered due to such a compression process. This measure therefore also contributes to an optimization of the component quality. The pre-compaction of the deposited arrangement of rovings together with the binder material consequently can be carried out in the form of a mere heat treatment. In this respect, it would be possible to irradiate the deposited arrangement of rovings and the binder material with microwave or infrared radiation. The fibers may be alternatively or additionally heated by means of resistance heating, in which the fibers are charged with an electric current such that they are heated in a predetermined fashion. It is proposed to heat the arrangement of rovings together with the binder material, in particular, to the range between 60 and 100 degrees Celsius.

In the inventive method, the mould surface of the moulding tool may be designed in such a way and the deflection devices may be arranged on the mould surface in such a way that they define an application surface with a surface shape that is undevelopable at least in certain areas.

According to the invention, the term undevelopable application surface refers to a shape of the application surface that is curved in two dimensions. In this case, the application surface may, e.g., have a spherical shape, an ellipsoidal shape or the shape of a saddle surface at least in certain areas. Vice versa, the term developable surface in this context refers, in particular, to a three-dimensional surface that can be transformed into the plane without internal shape change, i.e., true to its length.

The deflection devices provided in accordance with the invention may protrude from the mould surface of the moulding tool in a pin-shaped fashion.

The preform may be separated from the deflection devices by cutting off the roving sections that respectively extend around the deflection device from the roving sections lying on the mould surface.

The preform may be separated from the deflection devices by retracting deflection devices that are movably arranged on the moulding tool and/or by cutting off the rovings deflected by at least part of the deflection devices in the vicinity of the deflection devices.

According to another exemplary embodiment of the inventive method, it is proposed:
that the at least one roving is arranged on a tool support device before it is applied onto the mould surface of a moulding tool, wherein the tool support device features deflection areas that extend in the longitudinal direction and along the mould surface when the moulding tool is accommodated by the tool support device with the aid of the receptacle device and said deflection areas feature a plurality of deflection devices, and wherein the deflection areas extend on sides of the mould surface that respectively lie opposite of one another, and
that the application of binder material, the consolidation of the arrangement of fiber strands and binder material and the separation of the preform from the moulding tool take place after the application of the roving onto the mould surface of the moulding tool by deflecting the endless fibers with the aid of the deflection devices.

Since the deflection devices are respectively provided on the areas of the tool support device that lie laterally of the receptacle device and of the moulding tool, it is possible to use variations of the moulding tool without having to exchange the rest of the manufacturing device. This in turn makes it possible to manufacture preforms for, e.g., aircraft frames for different fuselage sections that only differ little with respect to their shape or differ with respect to their dimensions rather than their shape on the same receptacle device. The cost-effectiveness of the inventive method can be improved in this fashion.

According to another aspect of the invention, a moulding tool for manufacturing FRC/FRP-components component from endless fibers is proposed which features a mould surface that is convexly shaped at least in certain areas, wherein the moulding tool features two deflection areas that lie outside the mould surface and extend in the longitudinal direction and along the mould surface, as well as a plurality of deflection devices, wherein the deflection areas extend on sides of the mould surface that respectively lie opposite of one another, and wherein the deflection devices arranged in the deflection areas are distributed over the deflection areas along the longitudinal direction such that the deflection devices are suitable for deflecting the at least one roving tensioned over the mould surface.

According to another exemplary embodiment of the inventive moulding tool, the deflection devices may be retractable into the moulding tool below the mould surface by means of an adjusting device in order to separate the preform and designed in such a way that they strip off the endless threads deflected thereon during their retraction.

According to another exemplary embodiment of the inventive moulding tool, the mould surface of the moulding tool may have an undevelopable surface shape in certain areas.

According to another exemplary embodiment of the inventive moulding tool, the deflection devices feature pins that protrude from the mould surface of the moulding tool.

According to another exemplary embodiment of the inventive moulding tool, each deflection device may be respectively coupled to an adjusting device with a drive unit, wherein the drive units can be controlled individually by a control device.

According to another aspect of the invention, a manufacturing device with a moulding tool and a tool support device for manufacturing a FRC/FRP-component component from at least one roving is proposed, wherein:
the manufacturing device features a dispensing device for dispensing at least one roving,
the moulding tool has an outwardly curved mould surface, and
the tool support device features a receptacle device for accommodating a moulding tool, as well as deflection areas that extend in the longitudinal direction and along the mould surface when the moulding tool is accommodated by the tool support device with the aid of the receptacle device, wherein said deflection areas feature a plurality of deflection devices, and wherein the deflection areas extend on sides of the mould surface that respectively lie opposite of one another, and
the deflection devices arranged in the deflection areas are distributed over the deflection areas along the longitudinal direction such that the deflection devices are suitable for deflecting the roving tensioned over the mould surface.

According to another exemplary embodiment of the inventive manufacturing device, it is proposed that the manufacturing device features a depositing device with a pretensioning unit, by means of which the endless fibers can be tensioned over the mould surface with a predetermined minimum tensile stress by deflecting the endless fibers with the aid of the deflection devices. Consequently, a tensioned depositing of the rovings takes place sectionally, i.e., a linear depositing thereof on the mould surface.

According to another exemplary embodiment of the inventive manufacturing device, it is proposed that the depositing device features a robotic arm with an inlet device for leading in at least one roving and an outlet device for leading out the roving that is arranged on its three-dimensionally movable end. The robotic arm advantageously makes it possible to realize a stretched depositing and tensioning of the at least one roving between the deflection devices by respectively looping the roving around one respective deflection device.

According to another exemplary embodiment of the inventive manufacturing device, it is proposed that the robotic arm features a kinematic system that is positioned rearward of the movable end referred to the longitudinal fiber direction of a roving accommodated by the robotic arm and serves for compensating movements relative to deflection devices.

According to another exemplary embodiment of the inventive manufacturing device, it is proposed that the manufacturing device features a roll for accommodating the roving, and that the receptacle roll is mounted by means of a friction clutch that limits the tensile stress, with which the roving is tensioned over the mould surface, to a maximum value.

According to another exemplary embodiment of the inventive manufacturing device, it is proposed that the manufacturing device is a gantry system and features a displaceable gantry unit with the depositing device and, in particular, the robotic arm.

BRIEF DESCRIPTION OF THE DRAWINGS

Exemplary embodiments of the invention are described below with reference to the enclosed figures, in which.

DETAILED DESCRIPTION OF THE INVENTION

In the inventive method, a fiber-reinforced composite (FRC) component or fiber-reinforced plastic (FRP) component (that is not illustrated in the figures) is manufactured from rovings with the aid of a moulding tool 1 with a mould surface 3.

In this context, the term "rovings" refers to a bundle of endless fibers or filaments that may be untwisted and/or drawn. The individual filaments may consist of glass, aramide or carbon. The rovings R used in accordance with the invention may consist, in particular, of endless rovings and be wound up on spools or drums. The rovings R may, in particular, consist of dry fibers only such that they do not feature a matrix material. The filaments may consist of carbon fibers in this case. According to the invention, it is generally possible to use rovings in the form of endless rovings, endless yarns, endless twines, endless strings, endless interlaced yarns, endless woven fabrics or endless knitted fabrics.

Figure 1:
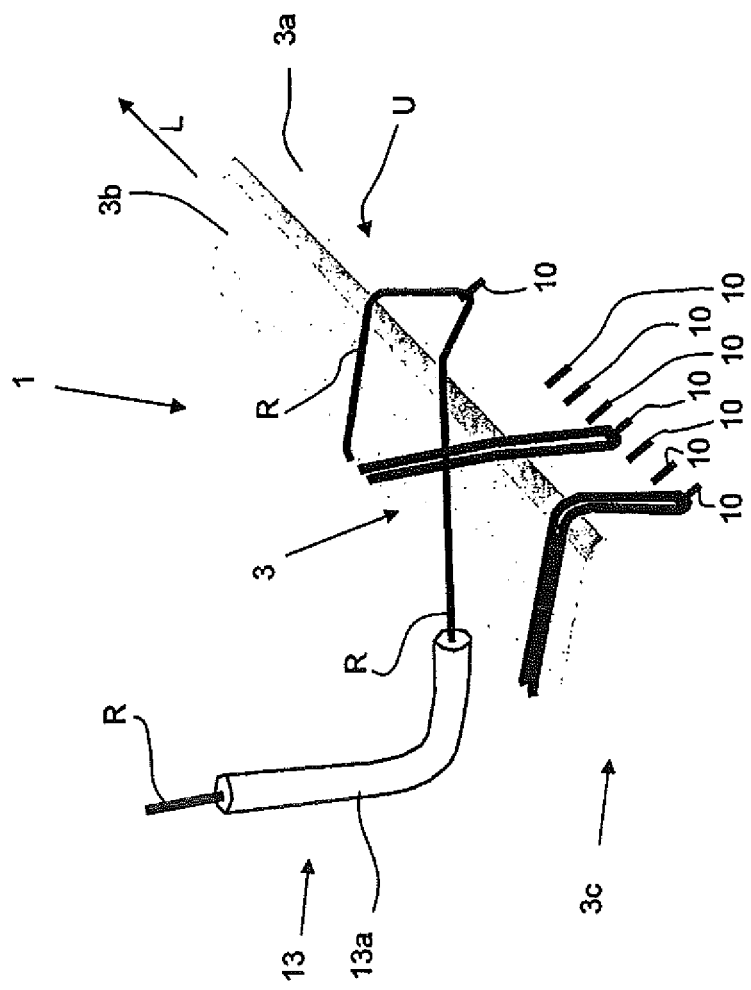
FIG. 1 shows a schematic perspective representation of one exemplary embodiment of the inventive manufacturing tool for carrying out the inventive method for manufacturing a FRC- or FRP-component with a developable mould surface, consisting of several partial application surfaces that extend angularly to one another and feature deflection devices in the form of pins, wherein this figure furthermore shows a tubular guiding device, by means of which rovings can be tensioned between the deflection pins along the mould surface by applying a tensile force.

The mould surface 3 generally features one or more application surfaces 3a, 3b, 3c that form at least part of the mould surface 3. The moulding tools 1 illustrated in FIGS. 1, 2 and 3 feature a total of three partial application surfaces 3a, 3b, 3c that form an application surface and part of the mould surface 3, wherein said partial application surfaces may, in particular, respectively extend angularly to one another in a cross-sectional view. The surface sections of the partial application surfaces 3a, 3b, 3c or the application surface may generally be connected by edges and/or by a radius or a curved surface area. The application surface may be alternatively or additionally formed by one or more surface sections that have a plane and/or a curved upper side. In this case, the surface may also feature a slight undercut referred to the direction of removal from the mould, wherein this undercut is designed in such a way that the produced preform can still be removed from the moulding tool 1 without being damaged. The mould surface, in general, at least sectionally has a convexly shaped or curved area.

Figure 2:
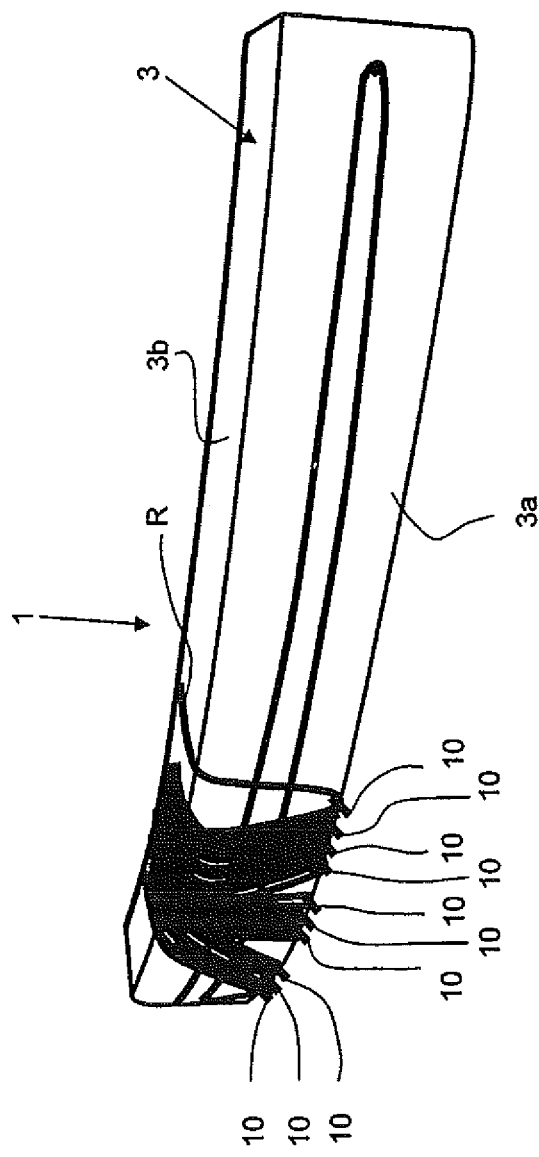
FIG. 2 shows a schematic perspective representation of an alternative exemplary embodiment of the inventive manufacturing tool or moulding tool that is curved in its longitudinal direction in order to manufacture FRC- or FRP-components with curved surfaces such that the mould surface and the application surface of the manufacturing tool have an undevelopable surface shape.
Figure 3:
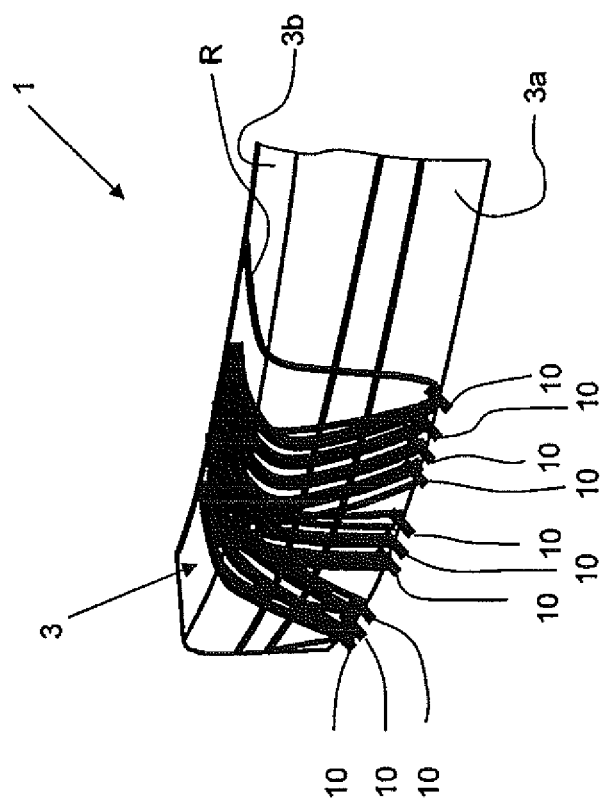
FIG. 3 shows an enlarged detail of the manufacturing tool illustrated in FIG. 2.

The mould surface and, in particular, the application surface with the partial application surfaces 3a, 3b, 3c generally may have a developable or undevelopable shape. The exemplary embodiment of the manufacturing tool or moulding tool illustrated in FIG. 1 features a mould surface 3 with an application surface 3a, 3b, 3c that has a developable surface shape. FIGS. 2 and 3 show an alternative embodiment of the manufacturing tool that features an application surface with an undevelopable shape. The inventive method is particularly suitable for manufacturing preforms with a shape that requires a moulding tool with an undevelopable surface shape in certain areas.

When using an undevelopable surface shape of the application surface, the utilization of rovings R consisting of dry fibers as proposed by the invention is advantageous because the rovings R can better slide on one another during their application such that the tensile forces acting in the rovings are minimized during the application thereof. If rovings that are pre-impregnated with a resin or a plastic would be used, however, adjacently positioned roving sections would adhere to one another and the resin or the plastic would more or less prevent the roving sections from sliding on one another such that additional tensile forces would occur between these roving sections and these roving sections could not sufficiently adapt to complex structures such as, in particular, undevelopable surface shapes.

Deflection devices 10 are arranged at different locations of the mould surface 3 such that the rovings can be applied onto the mould surface 3 between the deflection devices. The deflection devices 10 define the application surface with the partial application surfaces 3a, 3b, 3c that form part of the mould surface 3, i.e., they are arranged in a row laterally and along thereof. In this case, the rovings R are stretched and placed around the deflection devices 10 under tension such that they are pressed onto the partial application surfaces 3a, 3b, 3c with a force that corresponds to the tensile force, and the rovings R are tensioned along the mould surface between the deflection devices 10 such that the rovings R cover the mould surface at least in certain areas. For this purpose, the rovings R are placed around the deflection devices 10 under tension and stretched by means of an application device 13.

The partial application surfaces 3a, 3b, 3c therefore form the area, on which the rovings R lie after they are tensioned between the deflection devices 10. Consequently, the position of the partial application surfaces 3a, 3b, 3c is defined by the position of the deflection devices 10 and said partial application surfaces extend at least between the deflection devices 10. The mould surfaces 3a, 3b, 3c of the moulding tool 3 are designed in such a way and the deflection devices 10 are arranged on the mould surface 3 in such a way that the rovings R applied under tension by means of these deflection devices have an orientation that defines the orientations of the rovings or fibers in the component to be manufactured and to a certain extent may also be identical.

According to the invention, the at least one application surface 3a, 3b, 3c or the mould surface 3 of the moulding tool 1 may have an undevelopable surface shape in certain areas such that the rovings R also cover this area and the component to be manufactured also has an undevelopable surface shape in certain areas.

In one exemplary embodiment of the invention, a moulding tool 1 for manufacturing a FRC/FRP-component from endless fibers is provided which has a mould surface 3 with an undevelopable surface shape in certain areas. Deflection devices may be arranged on the mould surface 3 and protrude from the mould surface 3, wherein said deflection devices may be retractable relative to the mould surface and, in particular, into the moulding tool 1 below the mould surface 3 by means of an adjusting device in order to separate the preform. The deflection devices may feature or consist of pins that protrude from the mould surface 3 of the moulding tool 1. For this purpose, each deflection device may be respectively coupled to an adjusting device with a drive unit. The drive units may be functionally coupled to a control device individually and the control device may be realized such that it can control the drive units in order to adjust the deflection devices relative to the mould surface 3, i.e., to retract and extend the deflection devices.

It would be possible to apply two layers or more layers of rovings R onto the application surface. In this case, the layers of rovings could be applied with different orientations of the rovings relative to one another. The different layers of rovings may also consist of different materials.

After tensioning the rovings R, binder material is, according to the invention, applied onto the tensioned rovings R and the arrangement of fiber strands and binder material is simultaneously or subsequently consolidated or rendered manageable under the influence of heat and pressure. A preform for the component to be manufactured is produced due to the consolidation because the arrangement being manufactured is solidified at least to such a degree that the three-dimensional shape of the arrangement is also stable during the removal from the moulding tool 1 and during the transport to another tool, i.e., the shape of the preform does not change during the handling thereof in a predetermined fashion.

According to the inventive method, the preform is then separated from the deflection devices and the preform is removed from the moulding tool 1. After the separation of the preform from the deflection devices and from the moulding tool 1, an injection process or infusion process is carried out in accordance with the invention in order to manufacture the component. The injection process or infusion process may, in particular, be a pultrusion process. A fiber-reinforced composite (FRC) component or fiber-reinforced plastic (FRP) component is manufactured in this fashion depending on whether a resin or a plastic is used.

Prior to the consolidation, at least part of the rovings R may be sewn to one another in order to fix the arrangement of fiber strands and binder material.

The application of the rovings R and the application of binder material may take place successively, simultaneously or several times alternately.

The binder material may be a binding powder that is introduced between and/or applied on the rovings during the application thereof. The binder material may generally be a liquid or a powder and applied, in particular, by means of spraying.

A non-woven fabric may be alternatively or additionally used as binder material, wherein said non-woven fabric is placed or applied onto the fiber strands after the application of the fiber strands onto the tool mould. In this case, it would be possible to pin or fix the non-woven fabric on several of the deflection devices.

In another embodiment of the inventive method, a binder thread or several binder threads may be used as binder material, wherein the binder thread is applied together with each endless fiber strand.

It would furthermore be possible to apply multi-axial multiply fabrics (MAGs), woven fabrics, knitted fabrics, gusset fillers, braided fabrics, knitwear, non-woven fabrics or interlaced yarns after the application of fiber mats in the form of fiber strands. In another processing step, it would be possible to fix the fiber mats, MAGs, woven fabrics, knitted fabrics, gusset fillers, braided fabrics, knitwear, non-woven fabrics or interlaced yarns in order to produce the preform. The fiber mats, MAGs, woven fabrics, knitted fabrics, gusset fillers, braided fabrics, knitwear, non-woven fabrics or interlaced yarns may be fixed, in particular, together with the rovings R during the application thereof.

The rovings R can be wetted with resin after their application. After the application of at least part of the dry fiber strands, it would be possible to apply prepregs thereon in this case.

After the application of at least part of the rovings R, it would furthermore be possible to apply metal inserts, reinforcements of completely or partially cured FRP and/or FRC, core materials for cavities, plastic or metal foams or honeycomb structures thereon in order to stabilize the preform and/or to achieve predetermined properties in the component to be manufactured with the preform. In this case, it would be possible, in particular, to fix the metal inserts, reinforcements of completely or partially cured FRP and/or FRC, core materials for cavities, foams or honeycomb structures together with the rovings R during the application thereof.

The deflection devices 10 may be arranged on the moulding tool 1 such that they can be retracted relative to the mould surface 3, and the separation of the preform from the deflection devices can be realized by retracting the deflection devices 10 that are movably arranged on the moulding tool 1.

The preform may be alternatively separated from the deflection devices by cutting off the rovings R deflected by at least part of the deflection devices in the vicinity of the deflection devices.

The supply of the rovings R to be applied onto the mould surface 3 can be realized in different ways. The rovings R may be applied onto the moulding tool 1 with the desired fiber orientation directly from a roving receptacle roll. Alternatively, the rovings may also be deposited or applied by means of a tubular guide, through which the rovings R to be applied onto the moulding tool 1 are guided. The tubular guide 13a may be curved, particularly in its longitudinal direction, such that the direction of the rovings R guided through the tubular guide is changed in a predetermined fashion. This makes it possible to apply or tension the rovings between the deflection devices with a predetermined orientation and a predetermined tensile force. The tubular guide 13a itself is arranged such that it can be three-dimensionally moved relative to the moulding tool by means of a suitable motion mechanism and a corresponding adjusting device. The roving supply may also be realized by means of a robot or a robotic arm that can be moved relative to the moulding tool 1. The motion of the robotic arm or the actuation of the adjusting device can be controlled or regulated by a control device.

The consolidation of the arrangement of fiber strands may be realized with a vacuum process. The consolidation of the arrangement of fiber strands may take place after the depositing process or also between individual depositing sequences, in which rovings are applied onto the moulding tool 1.

The consolidation of the arrangement of fiber strands may also be realized by placing a vacuum mat between the moulding tool 1 with the arrangement of rovings R and binder material and an engaging surface and subsequently generating a negative pressure between the engaging surface and the vacuum mat while the arrangement of rovings R and binder material is heated.

It would furthermore be possible to realize the consolidation of the arrangement of fiber strands by means of a heating/pressing process carried out with a heated ram.

The inventive moulding tool 1 for manufacturing a FRC/FRP-component from endless fibers consequently features a mould surface 3 with a surface shape that is undevelopable in certain areas. Deflection devices arranged on the mould surface 3 protrude from the mould surface 3 and can be retracted into the moulding tool 1 below the mould surface 3 by means of an adjusting device in order to separate the preform.

The deflection devices may feature, in particular, pins that protrude from the mould surface 3 of the moulding tool 1.

An adjusting device with a drive unit may be respectively coupled to each deflection device. In this case, it would be possible, in particular, that the drive units can be individually controlled by a control device.

The invention claimed is:

1. A method for manufacturing a FRC/FRP-component from rovings by means of a moulding tool with a mould surface and an application surface, comprising the steps of:
   providing the moulding tool such that the application surface has an undevelopable surface shape, and a convex surface shape that is curved in two dimensions, at least in certain areas;
   providing deflection devices on the mould surface such that they are arranged in a row laterally and along thereof, thereby defining predetermined orientations there between, arranged laterally to the application surface, and arranged in a longitudinal direction to the application surface, and not arranged on the application surface;
   applying, in predetermined orientations between the deflection devices, at least one roving formed of dry fibers onto the mould surface by depositing the roving under tension by means of an application device such that the rovings are tensioned between the deflection devices along the mould surface in such a way that the rovings cover and contact the application surface and the mould surface at least in certain areas;
   applying binder material onto the tensioned rovings;
   consolidating the arrangement of fiber strands and binder material by applying heat in order to produce a preform for the component to be manufactured;
   separating the preform from the deflection devices and removing the preform from the moulding tool; and
   carrying out an injection process or infusion process in order to manufacture the component after separating the preform from the deflection devices.

2. The method according to claim 1, wherein the deflection devices protrude from the mould surface of the moulding tool in a pin-shaped fashion.

3. The method according to claim 1, wherein the rovings are endless rovings and formed of dry fibers only.

4. The method according to claim 1, wherein the rovings are formed of carbon fibers or glass.

5. The method according to claim 1, wherein at least part of the rovings are sewn to one another in order to fix the arrangement of fiber strands and binder material.

6. The method according to one claim 1, wherein the application of the rovings and the application of binder material takes place successively, simultaneously or several times alternately.

7. The method according to claim 1, wherein the binder material is formed by a non-woven fabric and the non-woven fabric is applied onto the fiber strands after the application thereof onto the tool mould.

8. The method according to claim 7, wherein the non-woven fabric is pinned or fixed on several of the deflection devices.

9. The method according to claim 1, wherein the binder material is formed by a binder thread and the binder thread is applied together with each roving.

10. The method according to claim 1, wherein the rovings are wetted with resin after the application thereof.

11. The method according to claim 1, wherein prepregs are placed on at least part of the rovings after the application thereof.

12. The method according to claim 1, wherein the separation of the preform from the deflection devices is realized by retracting the deflection devices that are movably arranged on the moulding tool.

13. The method according to claim 1, wherein the separation of the preform from the deflection devices is realized by cutting off the rovings deflected by at least part of the deflection devices in the vicinity of the deflection devices.

14. The method according to claim 1, wherein the consolidation of the arrangement of rovings is realized with a vacuum method.

15. The method according to claim 1, wherein the consolidation of the arrangement of rovings takes place after the depositing process or between individual depositing sequences, in which rovings are applied onto the moulding tool.

16. The method according to claim 14, wherein the consolidation of the arrangement of rovings is realized by placing a vacuum mat between the moulding tool with the arrangement of rovings and binder material and an engaging surface and by generating a negative pressure between the engaging surface and the vacuum mat while the arrangement of rovings and binder material is heated.

17. The method according to claim 1, wherein the consolidation of the arrangement of fiber strands is realized by means of a heating/pressing process carried out with a heated ram.

18. The method according to claim 1, wherein the injection/infusion process is a pultrusion process.

19. The method according to claim 1, wherein the at least one roving is arranged on a tool support device before it is applied onto the mould surface of a moulding tool,
   the tool support device includes deflection areas that extend in the longitudinal direction and along the mould surface when the moulding tool is accommodated by the tool support device with the aid of the receptacle device and said deflection areas feature a plurality of deflection devices,
   the deflection areas extend on sides of the mould surface that respectively lie opposite of one another, and
   the application of binder material, the consolidation of the arrangement of fiber strands and binder material and the separation of the preform from the moulding tool take place after the application of the roving onto the mould surface of the moulding tool by deflecting the endless fibers with the aid of the deflection devices.

* * * * *